US009304933B2

(12) United States Patent
Wang et al.

(10) Patent No.: US 9,304,933 B2
(45) Date of Patent: Apr. 5, 2016

(54) TECHNIQUES TO REQUEST STORED DATA FROM A MEMORY

(75) Inventors: Kebing Wang, Shanghai (CN); Jun Ye, Shanghai (CN); Jianyu Li, Shanghai (CN)

(73) Assignee: Intel Corporation, Santa Clara, CA (US)

(*) Notice: Subject to any disclaimer, the term of this patent is extended or adjusted under 35 U.S.C. 154(b) by 307 days.

(21) Appl. No.: 13/976,109

(22) PCT Filed: Feb. 18, 2011

(86) PCT No.: PCT/CN2011/000254
§ 371 (c)(1),
(2), (4) Date: Oct. 16, 2013

(87) PCT Pub. No.: WO2012/109770
PCT Pub. Date: Aug. 23, 2012

(65) Prior Publication Data
US 2014/0028693 A1    Jan. 30, 2014

(51) Int. Cl.
*G06F 12/08*       (2006.01)
*G06T 1/60*        (2006.01)
*G06F 9/45*        (2006.01)
*G06T 15/04*       (2011.01)
*G09G 5/39*        (2006.01)

(52) U.S. Cl.
CPC ........ *G06F 12/0875* (2013.01); *G06F 12/0886* (2013.01); *G06T 1/60* (2013.01); *G06F 8/4442* (2013.01); *G06F 2212/302* (2013.01); *G06F 2212/455* (2013.01); *G06F 2212/601* (2013.01); *G06T 15/04* (2013.01); *G09G 5/39* (2013.01)

(58) Field of Classification Search
None
See application file for complete search history.

(56) References Cited

U.S. PATENT DOCUMENTS

| 5,367,653 A * | 11/1994 | Coyle | G06F 12/0864 711/128 |
| 6,650,333 B1 * | 11/2003 | Baldwin | G06T 15/04 345/531 |
| 7,649,538 B1 * | 1/2010 | Minkin | G06T 1/60 345/428 |
| 2003/0046510 A1 * | 3/2003 | North | G06F 12/0864 711/203 |
| 2003/0126363 A1 | 7/2003 | David | |

(Continued)

FOREIGN PATENT DOCUMENTS

| CN | 1498369 A | 5/2004 |
| CN | 1753035 A | 3/2006 |
| CN | 101427282 A | 5/2009 |

(Continued)

OTHER PUBLICATIONS

International Search Report and Written Opinion received for International Application No. PCT/CN2011/000254, mailed on Aug. 25, 2011, 10 pages.

(Continued)

*Primary Examiner* — Carlos Perromat
*Assistant Examiner* — Xin Sheng
(74) *Attorney, Agent, or Firm* — Green, Howard & Mughal LLP (57) ABSTRACT

Techniques are described to configure a cache line structure based on attributes of a draw call and access direction of a texture. Attributes of textures (e.g., texture format and filter type), samplers, and shaders used by the draw call can be considered to determine the line size of a cache. Access direction can be considered to reduce the number of lines that are used to store texels required by a sample request.

15 Claims, 7 Drawing Sheets

(56) References Cited

U.S. PATENT DOCUMENTS

2006/0274078 A1* 12/2006 Chung .................... G06T 15/04
345/582
2008/0204466 A1* 8/2008 Yu ........................ G06F 12/0846
345/552

FOREIGN PATENT DOCUMENTS

| CN | 101937573 A | 1/2011 |
|---|---|---|
| WO | 02079995 A1 | 10/2002 |
| WO | 2012109770 A1 | 8/2012 |

OTHER PUBLICATIONS

International Preliminary Report on Patentability received for PCT Patent Application No. issued on Aug. 21, 2013, 5 pages.

Office Action Received for Chinese Patent Application No. 201180067831.5 mailed on May 6, 2015, 35 pages, including 6 pages of English Translation.

* cited by examiner

TECHNIQUES TO REQUEST STORED DATA FROM A MEMORY

FIELD

The subject matter disclosed herein relates generally to graphics, and more particularly to a texture cache line configuration.

RELATED ART

To add texture to a three-dimensional surface, a process known as texture mapping is used whereby texture elements (texels) are mapped to appropriate pixels in the output picture. Texture mapping is a method for adding detail, surface texture (a bitmap or raster image), or color. A texture map is applied or mapped to the surface of a shape or polygon. A texel is a fundamental unit in texture space. Textures are represented by arrays of texels, just as pictures are represented by arrays of pixels.

Figure 1:
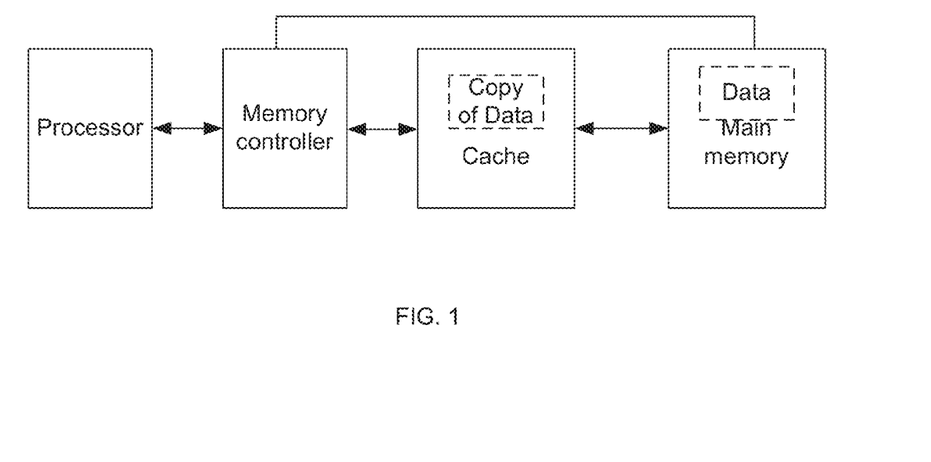
FIG. 1 is a block diagram of a system that uses a texture cache that allows a graphics controller, graphics processing unit, or central processing unit (CPU) to rapidly access texels.

FIG. 1 is a block diagram of a system that allows a graphics controller, graphics processing unit, or central processing unit (CPU) to rapidly access texels from a texture cache. A texture cache can be used to alleviate the outgoing memory traffic from a graphics memory or main memory. In some cases, a texture cache separately stores a texel's red, blue, and green components. If the processor needs data that is not available in the cache, the processor can read the data from the memory and overwrite existing data in the cache.

In the texture cache, a cache line represents the smallest unit of memory that can be transferred between the main memory and the cache. Rather than reading a single word or byte from main memory at a time, each cache entry usually holds a certain number of words, known as a cache line, and the whole line is cached or read at once. The line size of a texture cache is an important consideration for texture cache design. For example, if the texture cache line size is too small, there may not be enough room to store four large-sized texels, a common request for a bilinear sampling operation. However, if the cache line size is too large and contains more smaller-sized texels, an undesired operation may take place in which few of the texels in the cache line are used before the line is replaced.

Versions of Microsoft DirectX and OpenGL support use of various texture formats. Applications utilize multiple texture formats from small textures to large textures. For example, the maximum size difference between different texel formats can be 32 times. However, if a texture cache line size is a fixed size but an application requests to access a variety of texel formats, there may be an undesirably high level of cache misses, which decreases the cache efficiency. A cache miss takes place when the desired texture content is not stored in the texture cache.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments provide for a cache line structure that can be configured by software and/or hardware for each draw call. For example, an application program interface (API) of a DirectX and OpenGL compatible driver can be used to make a draw call. For example, before a draw call is made, the static attributes of textures (e.g., texture format and filter type), samplers, and shaders used by the draw call can be set through an API. A driver or other logic can parse the attributes and then configure a suitable cache line structure for each draw call.

A texture format attribute can be parsed to determine the texel size to be accessed by the draw call. The texel size can be used to determine the size of a cache line. If a texel size is large, the cache line size could be configured to be large. But if the texel size is small, then the cache line size could be configured to be small. Some researchers have found that texture cache efficiency in terms of hit rate can improve if a cache line contains 4-8 texels. Accordingly, for any format of texel, the cache line could be configured to store 4-8 texels. However, the cache line can be configured to store other numbers of texels.

The texture filter type attribute can be used to determine the sample texture footprint and the footprint can be used to determine the number of texels to be accessed by the draw call. The texture filter type attribute can be any of: point-sampling, linear-sampling, bilinear-sample, anisotropic-sampling, or MIPmap-sampling. Other filter types can be used. A point sampling filter may sample a single texel. A linear-sampling filter may sample 2 texels. A bilinear-sampling filter may sample 4 texels. A MIPmap-sampling filter may sample 8 texels. An anisotrophic-sampling filter may sample more than 100 texels. For example, a filter that samples a small footprint of texels, the cache line size can be configured to contain 4 texels or another number of texels. For a filter type with a large footprint, the cache line size can be configured to contain 8 texels or another number of texels.

Figure 2:
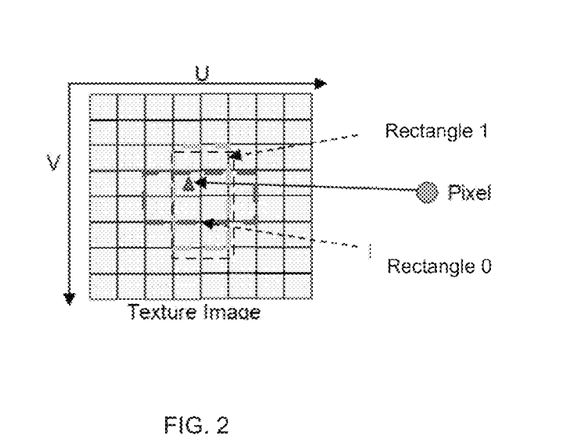
FIG. 2 shows that a sampling footprint for anisotropic filtering may be in the u-major or v-major directions.
Figure 3:
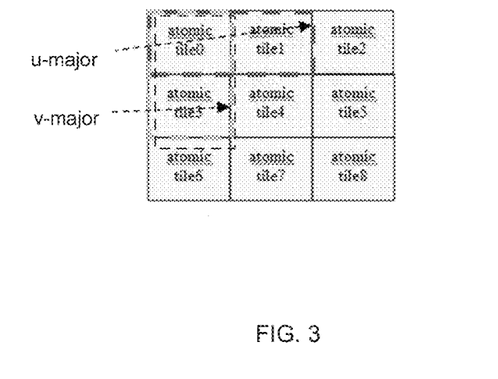
FIG. 3 depicts an example of atomic tile accesses for u-major and v-major directions.

As shown in the FIG. 2, the sampling footprint for anisotropic filtering may be like rectangle 0 or rectangle 1. For the rectangle 0, |Δu| is greater than |Δv|, which is called u-major. For rectangle 1, |Δv| is greater than |Δv|, which is called v-major. FIG. 3 depicts an example of atomic tile accesses for u-major and v-major directions. The tile structure of an atomic line is not configurable. The atomic tile size is implementation dependent. For example, the atomic line size could be 16 or 32 bytes, but a smaller size may waste the memory bandwidth. How many texels are in an atomic line depends on the texel format. For example, when a vendor uses a 32 byte atomic line, the atomic line contains 4 texels if the texel size is 8-bytes or the atomic line contains 2 texels if the texel size is 16-bytes. When texture access direction is u-major, the 2 atomic lines that make up a larger line include atomic tiles 0 and 1. When texture access direction is v-major, the 2 atomic lines include atomic tiles 0 and 3.

Various embodiments also include a technique to dynamically configure the tile structure of a larger cache line made up of atomic lines according to texture access direction. For example, a 64 byte cache line can be a combination of two 32 byte atomic tiles. When a cache miss occurs and the texture access direction is u-major, the memory controller can load 2 atomic tiles whose footprint in memory will be similar to the combination of tiles 0 and 1 in FIG. 3. When a cache miss occurs and the texture access direction is v-major, the memory controller can load 2 atomic tiles whose footprint of memory will be similar to the combination of tiles 0 and 3 in FIG. 3. Two atomic tiles can be stored in one or more cache ways.

The tile structure of a texture cache line can be configured as either u-major or v-major. If the tile structure of the cache line matches the texture access direction, the requested texel footprint occupies less of a cache line slot, which improves the cache hit efficiency. Otherwise, if the tile structure of the cache line conflicts with the texture access direction, the footprint occupies more cache line slots, which decreases the cache efficiency.

When the texture is first used, the texture access direction is not considered. So the default structure of a cache line may conflict with the real texture access direction. Performance counters statistics can be used to detect that there is conflict. For example, with reference to FIG. 3, if the configuration of a cache line is u-major, atomic tiles 0 and 1 make up a large cache line and atomic tiles 3 and 4 make up another large cache line. If the configuration of a cache line is v-major, atomic tiles 0 and 3 make up a large cache line and atomic tiles 1 and 4 make up another large cache line. When texture access direction is u-major and the footprint covers tile 0 and tile 1, retrieval of a single cache line can provide the desired footprint if the cache line also stores a u-major configuration. When texture access direction is u-major, but the configuration of the cache lines is v-major, then contents of two cache lines are retrieved to provide the sample footprint. A cache hit can occur while an access direction conflict occurs with more cache lines accessed to service a sample request. Accordingly, storing the footprint in the same access direction configuration as that of the draw call allows retrieval of a footprint with fewer cache line retrievals than if the directions conflict. Cache efficiency can be improved when the footprint occupies fewer cache lines. Configuration based on access direction involves loading the texture footprint into cache lines so that the footprint occupies less cache lines.

Figure 5:
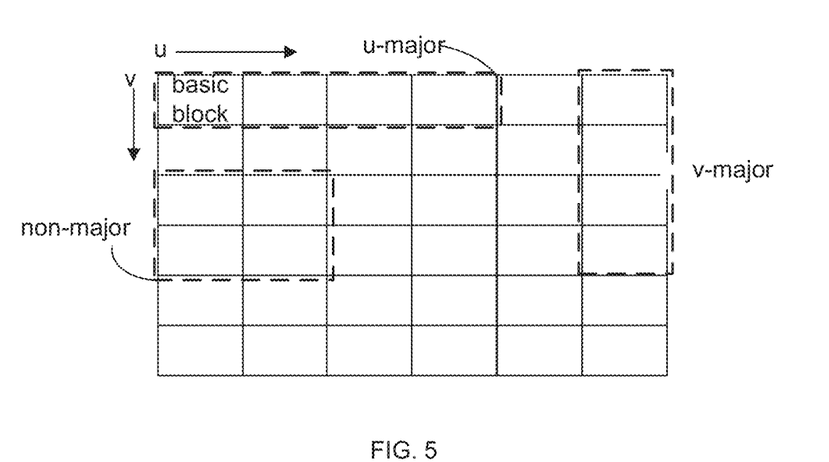
FIG. 5 shows original blocks combine to form various potential structures.

In various embodiments, a GPU, controller, processor, or other logic can learn how to configure a cache line structure for a texture through performance events statistics. When a texture is reused, hardware can configure the cache line structure based on a previous usage of the texture. For example, when 4 original cache blocks combine to become a larger cache line, there are 3 potential structures: non-major, u-major, and v-major, as shown in FIG. 5. A basic block is an atomic tile. When a texture is first accessed, a default configuration of the cache line structure can be non-major. When the texture is accessed the first time, performance counters can be sampled to detect texture access direction, such as u-major. For example, when the texture is accessed again, the cache line size can be configured as u-major according to previous usage. Configuration as u-major involves loading the texture footprint into cache lines so that the footprint occupies less cache lines.

Two performance counters can be used. A first counter is to count occurrence of an event that Δu of a sample footprint is bigger than Δv and a second counter is to count occurrence of an event that Δv of a sample footprint is bigger than Δu. The texture access direction can be determined by comparing the values of these two counters. If the first counter is greater than the second counter for some number of intervals, then the access direction is considered u major. If the second counter is greater than the first counter for some number of intervals, then the access direction is considered v major. When the texture is reused, a graphics processor or other device is able to configure the cache line with an optimized direction to improve the cache efficiency.

The shader program can be parsed to determine which texture is dominant, when multiple textures are accessed. When multiple textures are accessed in a draw call, optimal cache line sizes and structures may be conflict for different textures. The cache line size and structure can be associated with the dominant texture. In a shader program, a dominant texture can be a texture is sampled by a larger number of sample instructions than other textures or the dominant texture is sampled by the sample instructions in a loop body.

The cache line structure can be configured based on the dominant texture format and filter type. If the dominant texture is used for the first time, the cache line structure can be configured based on static attributes. If the dominant texture is attempted to be accessed from the cache a second or subsequent time, the cache line structure can be configured not only based on the static attributes but also based on dynamic usage statistics of one or more prior accesses such as dynamic access direction. Static attributes can be used to determine the cache line size whereas texture access direction can be used to determine atomic lines to be accessed from main memory. Atomic lines can be combined to potentially form a larger size cache line configuration. The cache line size can be adjusted before each draw call according to the dominant texture of each draw. The dominant textures of different draw calls could be different.

Various embodiments provide a dynamically configurable n-way set-associative texture cache with m-byte line size. The cache line of the basic configuration is called an atomic cache line. The basic configuration is used to store smaller-sized texels. A small sized texel can be 1-4 bytes for example. When a larger sized texel is stored, the texture cache can be configured to have a smaller number of columns (n/x-way set-associative) with larger line size (m*x-byte line size), where x is 2, 4, and 8 and n/x is greater than 1. For any configuration, the number of ways (columns) in a set is greater than 1 to avoid block-conflicting for MIPmap filtering. In other words, there are x atomic cache lines in a set that make up a re-configured cache having a larger line with size increased by x times but with the number of ways reduced by being divided by x. Texture format and filter type attributes described earlier can be used to determine variables n (number of ways) and m (number of bytes in a line). Initially, n and m values are determined by the basic texture cache structure, which depends on the GPU vendor design.

The cache line size can be enlarged to store more texels or larger texels, with the number of cache ways decreased simultaneously. When a filter samples more texels, the cache line size m is increased, and the number of cache ways is decreased. For example, various embodiments can allow the cache line to store about 8 texels for most texture formats, and this number of texels in a cache line efficiently utilizes the texture sampling locality.

When a texture is first used by an application, the cache line direction is set to u-major by a driver if the texture width is bigger than its height. Otherwise, the cache line direction is set v-major if texture height is larger than its width. The default concatenation cache line direction can be u-major or v-major.

The size of the memory request is known based on the cache miss because the size of the memory request is equal to the current cache line size. The memory request causes a repeat memory read request with same index, offset, and tag but with a different sized memory request. The size of the memory request is adjusted to be equal to the cache line size. When a cache miss occurs, the cache configuration module tells the memory controller the size of the current cache line and the access direction. For 32-byte configuration, one way of a 32-byte cache line is filled with 32-bytes worth of atomic tiles according to the access direction. For 64-byte configuration, two ways of 32-byte cache lines are filled with 64-bytes worth of atomic tiles according to the access direction. For 128-byte configuration, four ways of 32-byte cache lines are filled with 128-bytes worth of atomic tiles according to the access direction. Note that if a single way is used to store the atomic tiles, then use of access direction does not improve efficiency. Accordingly, access direction may not be considered if a single way stores the atomic tiles.

Figure 4A:
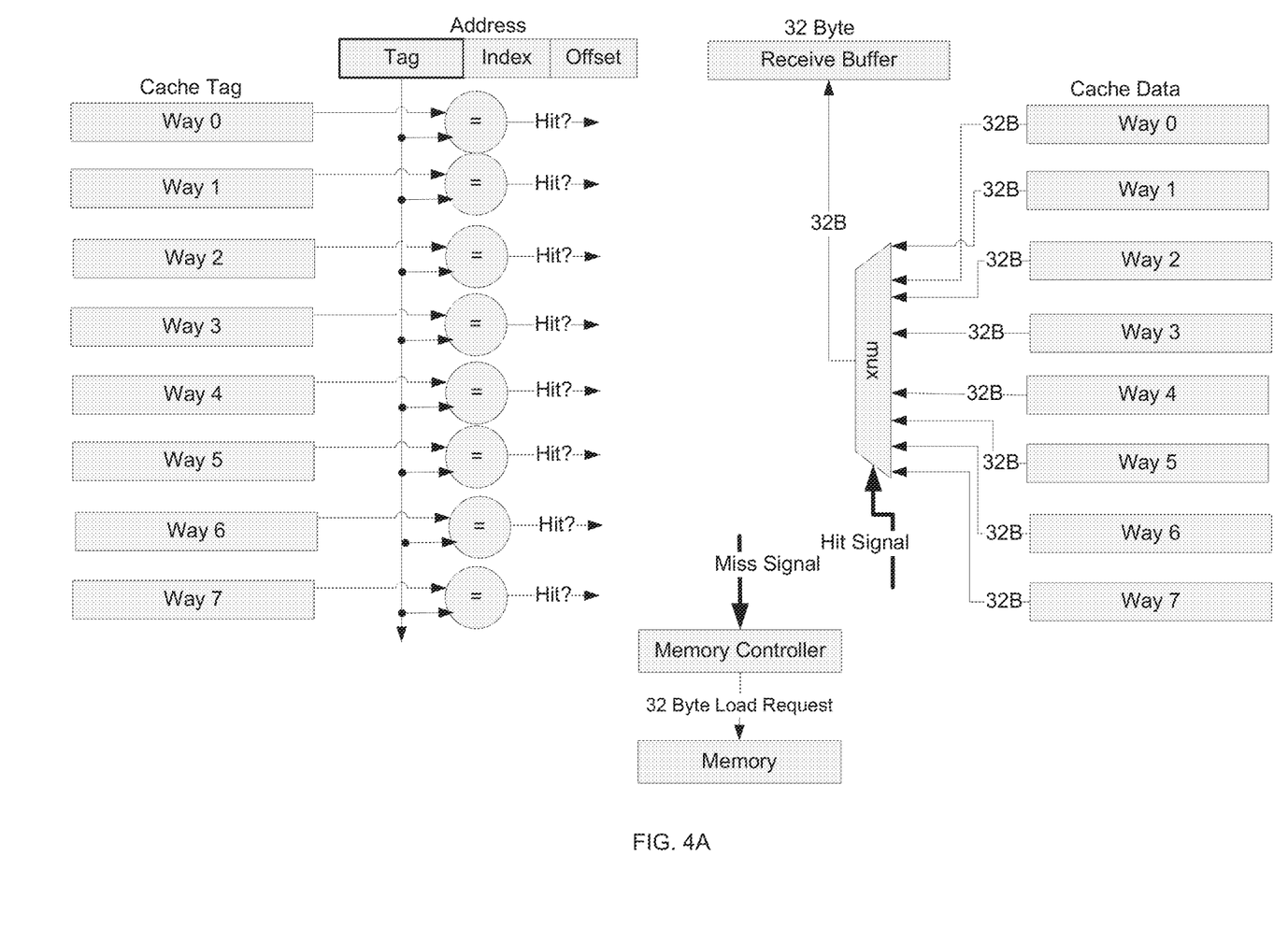
FIG. 4A shows the basic configuration of a texture cache which is 8-way set associative with 32-byte line size.

FIG. 4A shows the basic configuration of a texture cache which is 8-way set associative with 32-byte line size. There can be two other potential configurations for this basic configuration shown in FIGS. 4B and 4C. Additional logic can be added to the configuration to FIG. 4A to permit configuration as in FIG. 4B or 4C. Multiplexers, concatenation logic, cache configuration module, memory controllers can be activated or de-activated based on the desired configuration. In some embodiments, a cache is configurable so that any of the structures of FIGS. 4A-4C can be used rather than there being separate implementations of FIGS. 4A-C in different texture caches.

Referring to FIG. 4A, for a cache access, 8-way tags are compared simultaneously. The tag from each way is compared to the tag. For a way whose tag matches the received tag, a cache hit occurs. For a cache hit, the hit signal directs the way that triggered the hit and having 32-bytes of data to be output to the receive buffer. A cache miss occurs when no hit signal is positive. For a cache miss, cache controller module directs memory controller to load 32 bytes data from memory.

Figure 4B:
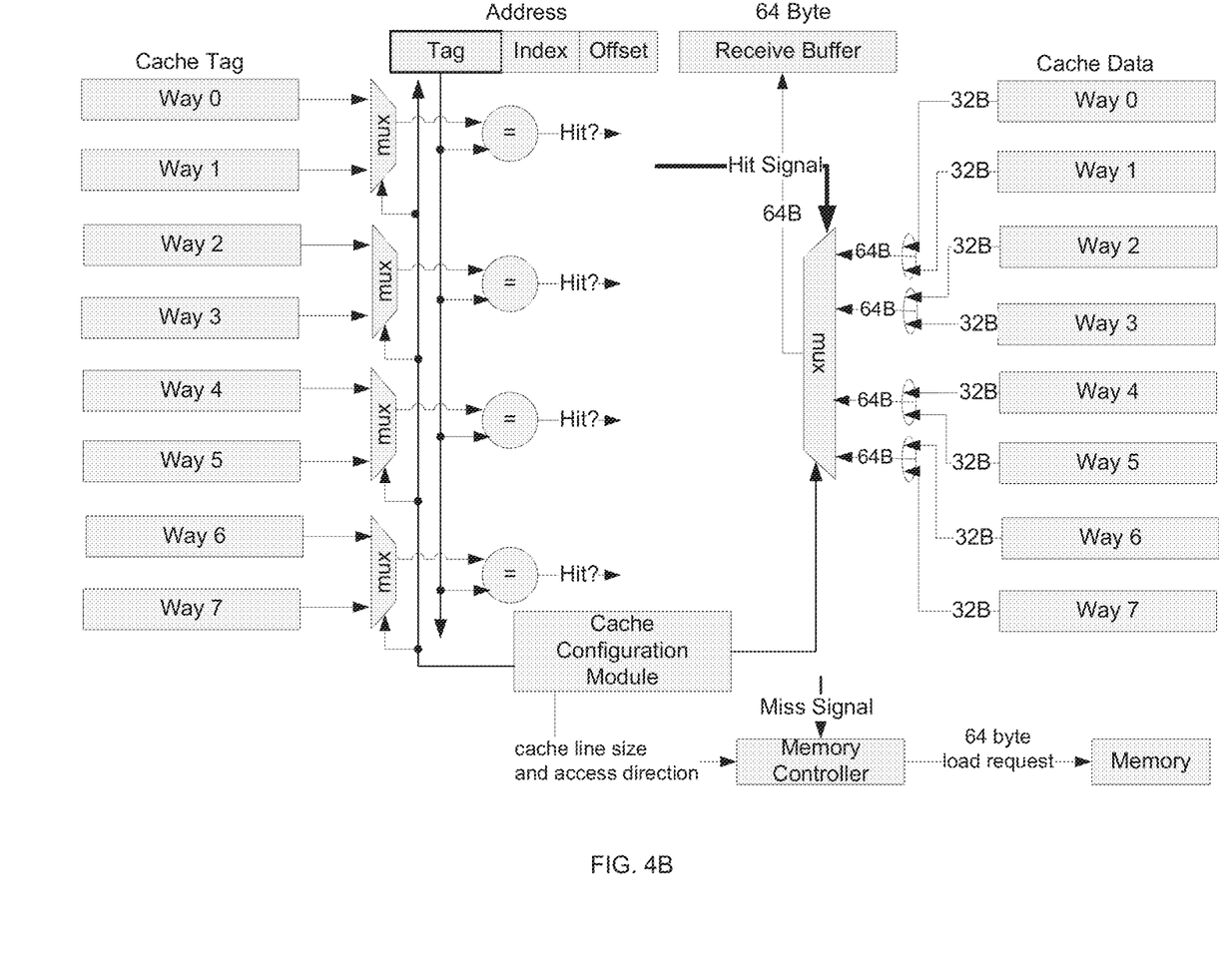
FIG. 4B shows a potential configuration of the texture cache which is 4-way set associative with 64-byte line size.

FIG. 4B shows a potential configuration of the texture cache which is 4-way set associative with 64-byte line size. In this configuration, 2 cache lines of a set appear as 1 larger cache line because content from two 32-byte cache lines are combined into a 64-byte content. For a cache access, a cache configuration module selects 1 way from every 2 ways of tags for comparison, so there are only 4 tag comparisons just like a 4-way cache. The selected tag can be any of the 2 tags. Fewer comparisons can potentially reduce power consumption. For a cache hit, the configuration module and hit signal direct two original ways of 32-byte data output to 64-byte receive buffer. The output two original ways are associated with the group of ways whose tag matched the provided tag. A cache miss occurs when no hit signal is positive. For a cache miss, a cache controller module directs memory controller to load 64 bytes data, which is a combination of 2 atomic blocks from memory when an atomic block is 32 bytes.

Figure 4C:
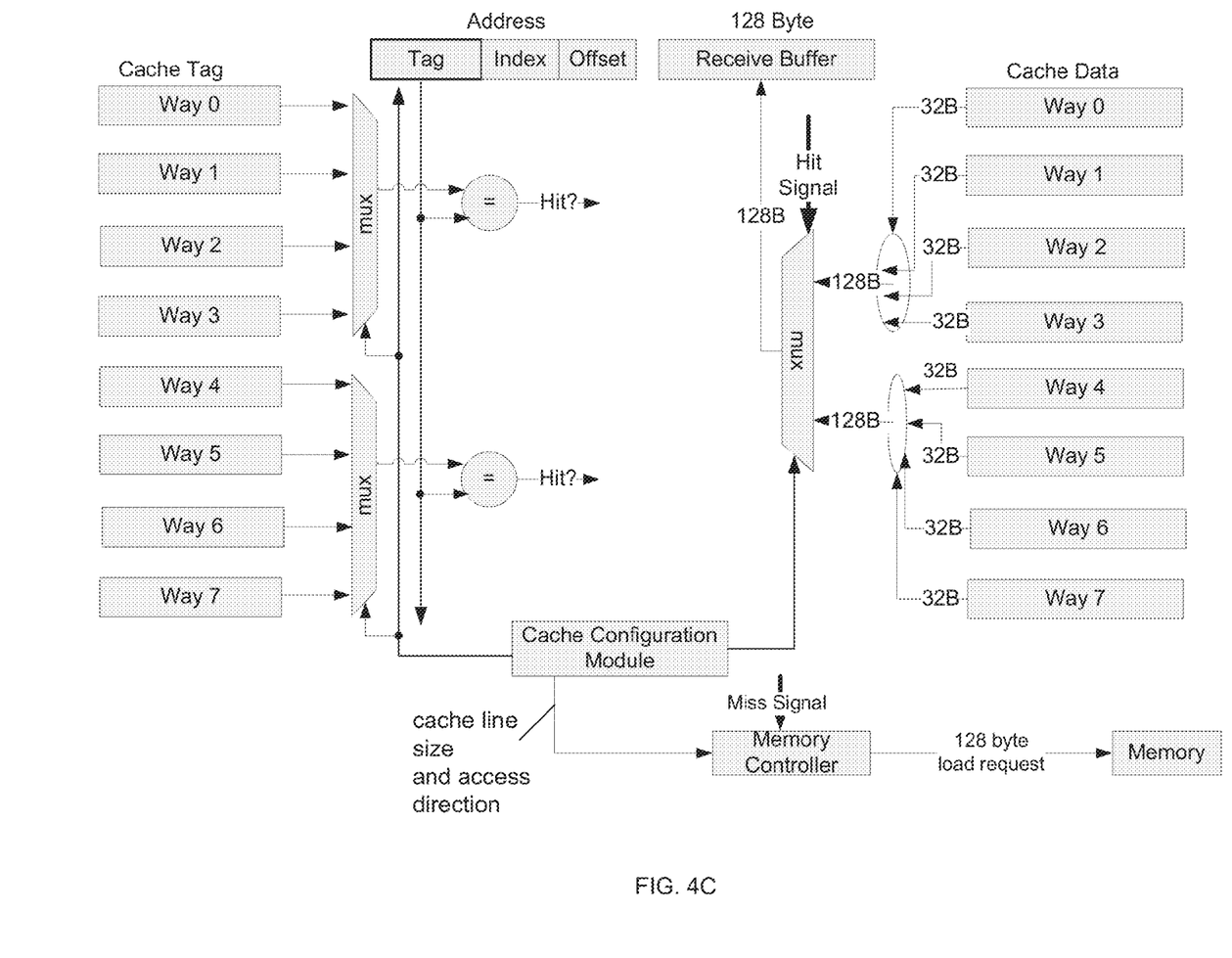
FIG. 4C shows a potential configuration of the texture cache which is 2-way set associative with 128-byte line size.

FIG. 4C shows a potential configuration of the texture cache which is 2-way set associative with 128-byte line size. In this configuration, a 4 cache line of a set appears as 1 larger cache line because four 32-byte content are combined into 128-byte content. For a cache access, cache configuration module selects 1 way from every 4 ways of tags for comparison, so there are 2 tag comparisons just like a 2-way cache. The selected tag can be any of the 4 tags. Fewer tag comparisons can potentially reduce power consumption. For a cache hit, the configuration module and hit signal direct four original ways of 32-byte data output to 128-byte receive buffer. The output four original ways are associated with the group of ways whose tag matched the provided tag. A cache miss occurs when no hit signal is positive. For a cache miss, cache controller module directs memory controller to load 128 bytes data, which is a combination of 4 atomic blocks from memory when an atomic block is 32 bytes.

Figure 6:
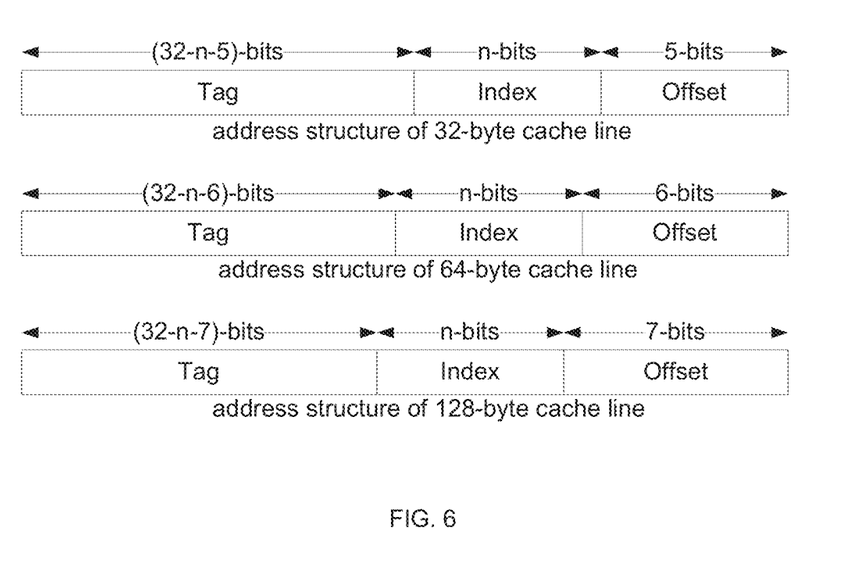
FIG. 6 shows different address structures for different cache configurations.

FIG. 6 shows address structures for different cache configurations. For a 32-byte cache line size, the least significant 5 bits are used as an offset to locate a byte in a cache line, the middle significant n bits are used to locate a set of cache lines (the cache has $2^n$ number of sets), and the most significant (32-n-5) bits are used for tag comparison for a 32 bit width address.

For 64-byte cache line size, the least significant 6 bits are used as an offset to locate a byte in a cache line, the middle significant n bits are used to locate a set of cache lines (the cache has $2^n$ number of sets), and the most significant (32-n-6) bits are used for tag comparison for a 32 bit width address.

For 128-byte cache line size, the least significant 7 bits are used as an offset to locate a byte in cache line, the middle significant n bits are used to locate a set of cache lines (the cache has $2^n$ number of sets), and the most significant (32-n-7) bits are used for tag comparison for a 32 bit width address.

In FIG. 6, if the structure of a larger cache line is u-major, the bits used for locating a byte in a combined larger line are from the u coordinate. If the structure of a larger cache line is v-major, the bits added for locating a byte in a combined larger line are from the v coordinate.

Figure 7:
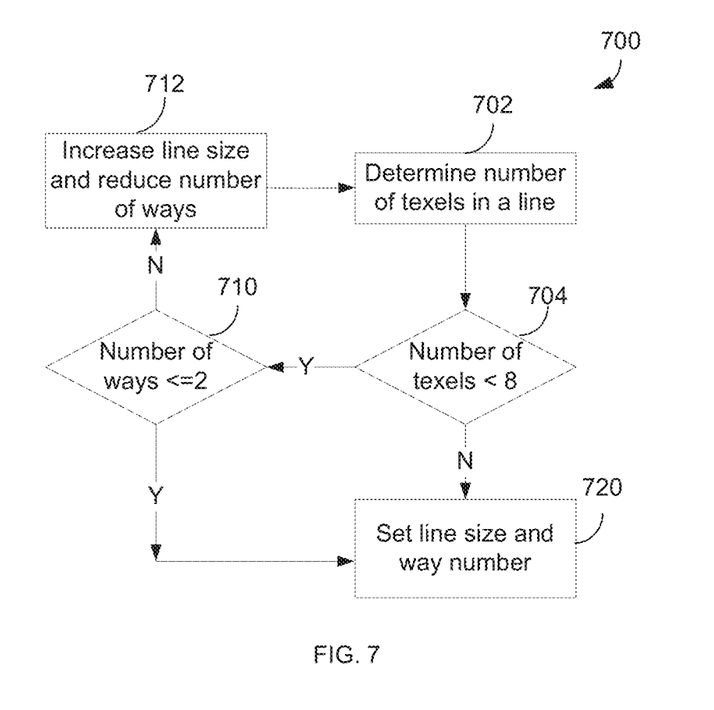
FIG. 7 shows a process to configure a cache line size and number of ways.

FIG. 7 shows a process for cache line configuration. In particular, FIG. 7 shows a process to configure a cache line size so that the cache line size is enlarged until each line includes at least 8 texels or there are at most two ways. Block 702 includes determining a number of texels storable in a line. Block 702 includes determining m/d, where initially, value m is set to the atomic line size in terms of bytes and value d is the texel size in terms of bytes. Block 704 includes determining whether the number of texels storable in a line is less than 8. If the number of texels storable in a line is less than 8, then block 710 follows block 704. If the number of texels storable in a line is 8 or more, then block 720 follows block 704.

Block 710 includes determining whether the number of ways in a cache (n) is at most two. If the number of ways in a cache is greater than two, then block 712 follows block 710. If the number of ways in a cache is at most two, then block 720 follows block 710.

Block 712 includes increasing the line size and reducing the number of ways. For example, block 712 can include doubling the line size (m) and halving the number of ways (n), although other manners of increasing the line size and reducing the ways can be used. The number of ways n is at least greater than 1 to avoid block-conflicting for MIPmap filtering. Block 702 follows block 712 to determine the number of texels storable per line after adjustment of the line size and way number. The process repeats until the line size is sufficiently large to include at least 8 texels or the number of ways is at most 2.

Block 720 includes setting the line size to the line size that stores 8 or more texels and setting the number of ways to either the initialized value or the value that was determined in the most iteration of block 712.

The process of FIG. 7 can be adapted to set line size to any number of bytes or texels and the number of ways adjusted accordingly. For example, block 704 can be changed to determine whether a number of texels is less than the desired number of texels in a line. Block 710 can consider whether another number of ways is present. The desired number of texels can be set between 4 and 8, although other values can be used.

Figure 8:
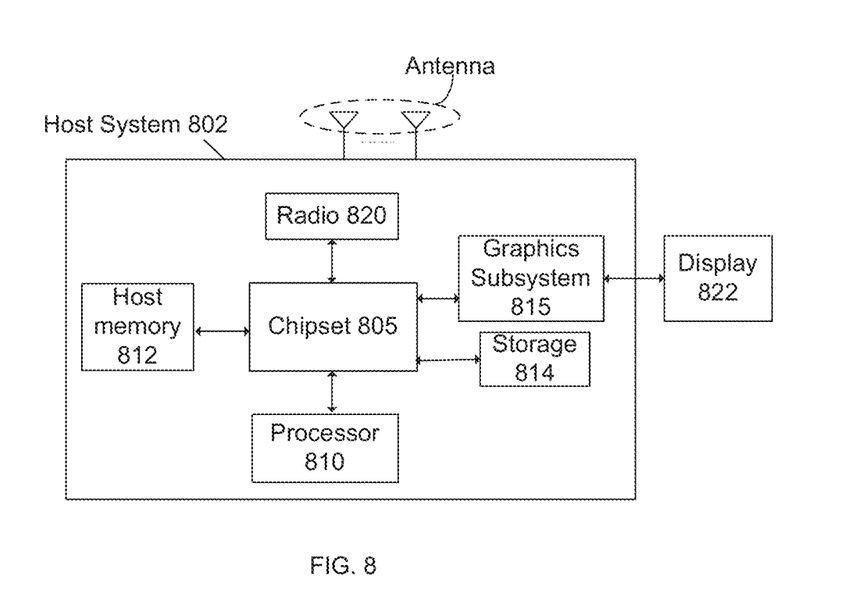
FIG. 8 provides an example of a system in accordance with an embodiment.

FIG. 8 provides an example of a system in accordance with an embodiment. The system can be used in a mobile station, user element, netbook, handheld computer, handheld phone, and so forth. Computer system 800 may include host system 802 and display 822. Computer system 800 can be implemented in a handheld personal computer, mobile telephone, set top box, or any computing device. Any type of user interface is available such as a keypad, mouse, touch screen, and/or gesture or motion recognition. Host system 802 may include chipset 805, processor 810, host memory 812, storage 814, graphics subsystem 815, and radio 820. Chipset 805 may provide intercommunication among processor 810, host memory 812, storage 814, graphics subsystem 815, and radio 820. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit. In various embodiments, processor 810 can be configured with instructions to perform techniques described herein.

Host memory 812 may be implemented as a volatile memory device such as but not limited to a Random Access Memory (RAM), Dynamic Random Access Memory (DRAM), or Static RAM (SRAM). Storage 814 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 815 may perform processing of images such as still or video for display. An analog or digital interface may be used to communicatively couple graphics subsystem 815 and display 822. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805. In various embodiments, graphics subsystem 815 can be configured to perform techniques described herein.

Radio 820 may include one or more radios capable of transmitting and receiving signals in accordance with applicable wireless standards such as but not limited to any version of IEEE 802.11 and IEEE 802.16. For example, radio 820 may include at least a physical layer interface and media access controller. Radio 820 can include a baseband processor to perform techniques described herein.

Figure 9:
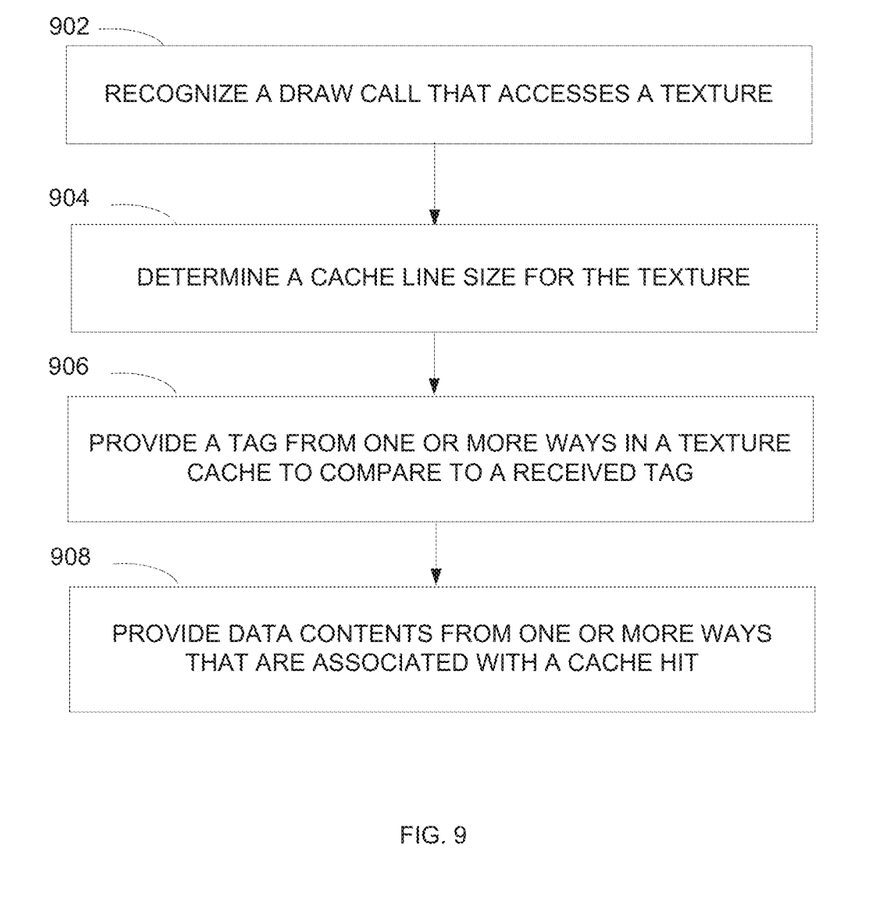
FIG. 9 depicts a process to access a texture from a cache with configurable line size.

FIG. 9 depicts a process to access a texture from a cache with configurable line size.

Block 902 includes recognizing a draw call that accesses a texture.

Block 904 includes determining a cache line size for the texture. A cache line size for the texture can be influenced by a texture format attribute and texture filter type of a dominant texture. A cache line size and structure can be based on the dominant texture. The texture format attribute can specify a texel size. The texture filter type can be any of point-sampling, linear-sampling, bilinear-sample, anisotropic-sampling, or MIPmap-sampling.

Block 906 includes providing a tag from one or more ways in a texture cache to compare to a received tag. For example, for a 32-byte cache line size, a tag from each way can be compared. For a 64-bytes cache line size, a tag from each group of two ways can be compared. For a 128-byte cache line size, a tag from each group of four ways can be compared. If a tag from the one or more ways matches the received tag, then there is a cache hit.

Block 908 includes providing data contents from one or more ways that are associated with a cache hit. Data from the way or group of two or four ways that yielded the cache hit are provided in block 908. Data from a group of ways can be combined and provided in block 908.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
   determining a cache line size for a texture associated with a draw call based in part on a texture format attribute and texture filter type of a dominant texture;
   selecting a tag from a group of one or more ways in a texture cache to compare to a received tag; and
   in response to a tag match, providing data contents from one or more ways associated with the tag match based in part on the determined cache line size.

2. The method of claim 1, wherein the texture format attribute specifies a texel size.

3. The method of claim 1, wherein the texture filter type comprises point-sampling, linear-sampling, bilinear-sample, anisotropic-sampling, or MIPmap-sampling.

4. The method of claim 1, wherein providing data contents from one or more ways associated with the tag match comprises:
   determining a number of ways associated with the tag match so that data storable in the determined number of ways is as large or larger than the cache line size and
   combining data contents from the determined number of ways.

5. The method of claim 1, further comprising:
   determining an access direction of the texture associated with the draw call and
   requesting to store the texture in one or more ways based on the access direction so that contents of the texture are stored in a minimum number of ways.

6. A configurable texture cache, the cache comprising:
   a plurality of ways, each way capable to store a block of data and a tag;
   comparator logic to compare a received tag with a tag from one or more of the ways and to generate a cache hit or miss indicator;
   combiner logic to selectively combine data from multiple ways, wherein a number of ways that are combined is based on a cache line size based in part on a texture format attribute and texture filter type of a dominant texture, and wherein the combiner logic provides a block of data or multiple sets of combined data;
   logic to provide a set of combined data in response to a received tag matching a tag from the set of combined data or to provide a block of data in response to a received tag matching a tag associated with a single way; and
   a processor to control which way releases a tag to the comparator logic and to control whether a block of data or combined data is output from the logic to provide a set of combined data.

7. The cache of claim 6, wherein the logic to provide selects a set of combined data to provide based in part on the set being associated with a tag that matched a receive tag.

8. The cache of claim 6, wherein the texture format attribute specifies a texel size and the texture filter type comprises point-sampling, linear-sampling, bilinear-sample, anisotropic-sampling, or MIPmap-sampling.

9. The cache of claim 6, further comprising:
   a memory controller to request data from memory for storage in one or more ways based on the cache line size and in response to a miss indicator.

10. The cache of claim 9, wherein the processor is to determine an access direction of a texture and configure the memory controller to store the requested data into one or more ways while minimizing a number of ways used for storage.

11. The cache of claim 6, wherein the size of a cache line is configured by combining data from multiple ways.

12. A system comprising:
   an antenna;
   a radio;
   a texture cache having multiple ways, wherein multiple cache line sizes are accessible from the texture cache by combination of data from one or more ways;
   a processor configured to determine a cache line size based in part on a texture format attribute and texture filter type of a dominant texture associated with a draw call, wherein the texture cache is to:
   select a tag from a group of one or more ways in the texture cache to compare to a received tag and
   in response to a tag match, access data contents from one or more ways associated with the tag match based in part on the determined cache line size.

13. The system of claim 12, wherein the texture format attribute specifies a texel size and the texture filter type comprises point-sampling, linear-sampling, bilinear-sample, anisotropic-sampling, or MIPmap-sampling.

14. The system of claim 12, wherein the texture cache is also configured to:
   determine an access direction of a texture associated with the draw call and
   request to store the texture in one or more ways of the texture cache based on the access direction so that contents of the texture are stored in a minimum number of ways.

15. The system of claim 12, wherein a number of ways combined to form a cache line size is based on the number of bytes in the cache line size being equal to or less than a combined number of bytes in the combined number of ways.

* * * * *